United States Patent
Li

(10) Patent No.: US 11,019,508 B2
(45) Date of Patent: May 25, 2021

(54) PROXY-BASED SERVICE PROCESSING METHOD AND APPARATUS, AND NETWORK ELEMENT DEVICE

(71) Applicant: HUAWEI TECHNOLOGIES CO., LTD., Guangdong (CN)

(72) Inventor: Huan Li, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 151 days.

(21) Appl. No.: 16/242,697

(22) Filed: Jan. 8, 2019

(65) Prior Publication Data

US 2019/0191319 A1 Jun. 20, 2019

Related U.S. Application Data

(63) Continuation of application No. PCT/CN2017/104555, filed on Sep. 29, 2017.

(30) Foreign Application Priority Data

Dec. 28, 2016 (CN) .......................... 201611238338.6

(51) Int. Cl.
*H04W 24/02* (2009.01)
*H04L 29/08* (2006.01)
(Continued)

(52) U.S. Cl.
CPC ............. *H04W 24/02* (2013.01); *H04L 29/08* (2013.01); *H04L 67/14* (2013.01); *H04L 67/327* (2013.01);
(Continued)

(58) Field of Classification Search
CPC ....... H04W 24/02; H04W 4/50; H04W 40/24; H04W 88/182; H04L 67/14; H04L 67/327; H04L 29/08
See application file for complete search history.

(56) References Cited

U.S. PATENT DOCUMENTS

| 7,385,957 B2 | 6/2008 | O'Neill |
| 2002/0026482 A1 | 2/2002 | Morishige et al. |

(Continued)

FOREIGN PATENT DOCUMENTS

| CN | 1543125 A | 11/2004 |
| CN | 1801770 A | 7/2006 |

(Continued)

*Primary Examiner* — Ajay Cattungal
(74) *Attorney, Agent, or Firm* — Womble Bond Dickinson (US) LLP

(57) ABSTRACT

Present invention provides a proxy-based service processing method which includes: obtaining, by a server, a current network connection relationship between a plurality of network element devices within a management range; determining connected domains based on the current network connection relationship between the plurality of network element devices, where at least two network element devices in each connected domain are connected to each other; sending proxy activation information to at least one network element device in each connected domain, to activate the at least one network element device as a proxy device; and delivering a proxy task to the proxy device. For the method a current proxy task is delivered to the proxy devices, and the proxy devices deliver service data to the network element devices in the network, perform service convergence, perform service data processing, or perform another operation, thereby improving overall maintenance efficiency of the wireless network.

18 Claims, 5 Drawing Sheets

(51) Int. Cl.
*H04W 4/50* (2018.01)
*H04W 40/24* (2009.01)
*H04W 88/18* (2009.01)

(52) U.S. Cl.
CPC ............. *H04W 4/50* (2018.02); *H04W 40/24* (2013.01); *H04W 88/182* (2013.01)

(56) References Cited

U.S. PATENT DOCUMENTS

| | | | |
|---|---|---|---|
| 2003/0202506 A1* | 10/2003 | Perkins | H04L 41/0206 370/352 |
| 2008/0254768 A1 | 10/2008 | Faccin | |
| 2009/0103451 A1 | 4/2009 | Liu et al. | |
| 2010/0135244 A1 | 6/2010 | Oulai | |
| 2011/0238795 A1* | 9/2011 | Bauer | H04L 67/2838 709/220 |
| 2014/0064249 A1 | 3/2014 | Lee et al. | |
| 2014/0173018 A1* | 6/2014 | Westphal | H04L 45/123 709/213 |
| 2015/0295823 A1* | 10/2015 | Li | H04L 45/74 370/392 |
| 2016/0226825 A1* | 8/2016 | Ardeli | H04L 63/0281 |
| 2016/0316383 A1* | 10/2016 | He | H04L 61/1511 |
| 2017/0041836 A1 | 2/2017 | Huang et al. | |
| 2019/0141158 A1* | 5/2019 | Huang | H04L 67/1008 |

FOREIGN PATENT DOCUMENTS

| | | |
|---|---|---|
| CN | 101626575 A | 1/2010 |
| CN | 101895906 A | 11/2010 |
| CN | 102307114 A | 1/2012 |
| CN | 102447676 A | 5/2012 |
| CN | 102612021 A | 7/2012 |
| CN | 102833222 A | 12/2012 |
| CN | 102883297 A | 1/2013 |
| CN | 102902594 A | 1/2013 |
| CN | 105792305 A | 7/2016 |
| JP | 3831331 B2 | 10/2006 |
| WO | 2014000804 A1 | 1/2014 |
| WO | 2015/161482 A1 | 10/2015 |

* cited by examiner

PROXY-BASED SERVICE PROCESSING METHOD AND APPARATUS, AND NETWORK ELEMENT DEVICE

CROSS-REFERENCE TO RELATED APPLICATIONS

This application is a continuation of International Application No. PCT/CN2017/104555, filed on Sep. 29, 2017, which claims priority to Chinese Patent Application No. 201611238338.6, filed on Dec. 28, 2016. The disclosures of the aforementioned applications are hereby incorporated by reference in their entireties.

TECHNICAL FIELD

Embodiments of the present invention relate to wireless network technologies, and in particular, to a proxy-based service processing method and apparatus, and a network element device.

BACKGROUND

With rapid development of wireless communications technologies, a quantity of wireless communications stations grows exponentially. An operator often has tens of thousands of Macro Base Stations in a province and the quantity is even larger when Micro Base Stations are counted additionally. A wireless network is prone to radical changes as an environment changes, and these changes occur in real time. Therefore, the operator needs to adjust and optimize the wireless network in real time, and in addition, needs to make adjustments to recover from errors in real time. Network elements in the network need to be managed in real time to ensure a normal communication status of the network.

A wireless network management system is usually used to separately operate and manage each network element in the wireless network in the prior art. A single wireless network management node delivers information to all network elements in the wireless network.

However, when each network element is separately operated and managed in a centralized management manner in the prior art, the wireless network management node that manages the network elements has a limited concurrent capability, a long service processing time, and relatively low efficiency.

SUMMARY

Embodiments of the present invention provide a proxy-based service processing method and apparatus, and a network element device, to resolve the technical problems of a long service processing time and low efficiency when each network element is operated and managed in a centralized management manner in the prior art.

According to a first aspect, an embodiment of the present invention provides a proxy-based service processing method, including:

obtaining, by a server, a current network connection relationship between a plurality of network element devices within a management range;

determining at least one connected domains based on the current network connection relationship between the plurality of network element devices, where two or more network element devices included in each connected domain are connected to each other;

sending proxy activation information to at least one network element devices in each connected domain, to activate the at least one network element devices as proxy devices; and delivering a proxy task to the proxy device, where specifically, the proxy task includes: delivering service data to the network element devices in each connected domain, performing service convergence, or performing service data processing.

In one embodiment, before the sending proxy activation information to at least one network element devices in each connected domain, the method further includes:

sending proxy configuration instruction information to the at least one network element devices in each connected domain, where the proxy configuration instruction information is used to instruct the network element device to obtain proxy configuration data, and specifically, the proxy configuration data and the proxy task have a mapping relationship.

In one embodiment, the sending proxy configuration instruction information to the at least one network element devices in each connected domain includes:

selecting at least one target network element device from the at least two network element devices included in each connected domain; and sending the proxy configuration instruction information to the at least one target network element device.

In one embodiment, the delivering a proxy task to the proxy device includes:

obtaining proxy task data and proxy-task-data transmission path information, where the proxy-task-data transmission path information includes: an address of the proxy device and an address of a destination network element device;

generating a token based on the proxy-task-data transmission path information, and packetizing the token and the proxy task data to generate a data packet; and sending the data packet to the destination network element device based on the token and by using the proxy device.

In one embodiment, the token includes any one or combination of: a list of the destination network element devices, a list of commands to be forwarded, a manner of processing returned information, a validity time of the token, and a chain of trust.

According to a second aspect, an embodiment of the present invention provides a proxy-based service processing method, including:

receiving, by a network element device, proxy activation information sent by a server, and activating the network element device as a proxy device based on the proxy activation information;

receiving, by the proxy device, a data packet delivered by the server, where the data packet includes a list of destination network element devices; and sending, by the proxy device, the data packet to at least two destination network element devices based on the list of destination network element devices, where the proxy device and the at least two destination network element devices are connected to each other.

In one embodiment, before the receiving, by a network element device, proxy activation information sent by a server, and activating the network element device as a proxy device based on the proxy activation information, the method further includes:

receiving proxy configuration instruction information, where the proxy configuration instruction information is used to instruct the network element device to obtain proxy configuration data, and the proxy configuration data and content of the data packet have a mapping relationship; and obtaining the proxy configuration data, and configuring a proxy function based on the proxy configuration data.

In one embodiment, the data packet further includes a security token and proxy task data, and the sending the data packet to at least two destination network element devices based on the list of destination network element devices includes:

parsing the data packet to obtain the security token and the proxy task data in the data packet, where the security token includes the list of destination network element devices; and sending service data to the at least two destination network element devices based on the list of destination network element devices.

In one embodiment, the token includes any one or combination of: the list of destination network element devices, a list of commands to be forwarded, a manner of processing returned information, a validity time of the token, and a chain of trust.

According to a third aspect, an embodiment of the present invention provides a proxy-based service processing apparatus, including:

an obtaining module, configured to obtain a current network connection relationship between a plurality of network element devices within a management range;

a determining module, configured to determine at least one connected domains based on the current network connection relationship between the plurality of network element devices, where at least two network element devices in each connected domain are connected to each other; and a sending module, configured to send proxy activation information to at least one network element devices in each connected domain, to activate the at least one network element devices as proxy devices, where the sending module is further configured to deliver a proxy task to the proxy device, where the proxy task includes: delivering service data to the network element devices in each connected domain, performing service convergence, or performing service data processing.

In one embodiment, the sending module is further configured to: before sending the proxy activation information to the at least one network element devices in each connected domain, to activate the at least one network element devices as the proxy devices, send proxy configuration instruction information to the at least one network element devices in each connected domain, where the proxy configuration instruction information is used to instruct the network element device to obtain proxy configuration data, and the proxy configuration data and the proxy task have a mapping relationship.

In one embodiment, the sending module is configured to:

select at least one target network element device from the at least two network element devices included in each connected domain; and send the proxy configuration instruction information to the at least one target network element device.

In one embodiment, the sending module is configured to:

obtain proxy task data and proxy-task-data transmission path information, where the proxy-task-data transmission path information includes: an address of the proxy device and an address of a destination network element device;

generate a token based on the proxy-task-data transmission path information, and packetize the token and the proxy task data to generate a data packet; and send the data packet to the destination network element device based on the token and by using the proxy device.

In one embodiment, the token includes any one or combination of: a list of the destination network element devices, a list of commands to be forwarded, a manner of processing returned information, a validity time of the token, and a chain of trust.

According to a fourth aspect, an embodiment of the present invention further provides a network element device, including:

a receiving module, configured to receive proxy activation information sent by a server, an activation module, configured to activate the network element device as a proxy device based on the proxy activation information, where the receiving module is further configured to receive a data packet delivered by the server, where the data packet includes a list of destination network element devices; and a sending module, configured to send the data packet to at least two destination network element devices based on the list of destination network element devices, where the proxy device and the at least two destination network element devices are connected to each other.

In one embodiment, the receiving module is further configured to: before the proxy activation information sent by the server is received and the network element device is activated as the proxy device based on the proxy activation information, receive proxy configuration instruction information, where the proxy configuration instruction information is used to instruct the network element device to obtain proxy configuration data, and the proxy configuration data and content of the data packet have a mapping relationship; and the network element device further includes:

an obtaining module, configured to: obtain the proxy configuration data, and configure a proxy function based on the proxy configuration data.

In one embodiment, the data packet further includes a security token and proxy task data, and the sending module is configured to:

parse the data packet to obtain the security token and the proxy task data in the data packet, where the security token includes the list of destination network element devices; and send service data to the at least two destination network element devices based on the list of destination network element devices.

In one embodiment, the token includes any one or combination of: the list of destination network element devices, a list of commands to be forwarded, a manner of processing returned information, a validity time of the token, and a chain of trust.

According to a fifth aspect, an embodiment of the present invention provides a proxy-based service processing apparatus, including:

a processor and a memory, where the memory is configured to store a program instruction, and the processor is configured to invoke the program instruction in the memory to perform the proxy-based service processing method provided in the foregoing first aspect.

According to a sixth aspect, an embodiment of the present invention provides a network element device, including:

a processor and a memory, where the memory is configured to store a program instruction, and the processor is configured to invoke the program instruction in the memory to perform the proxy-based service processing method provided in the foregoing second aspect.

For the proxy-based service processing method and apparatus, and the network element device provided in the embodiments of the present invention, the current network connection relationship between the plurality of network element devices within the management range is obtained; the at least one connected domains are determined based on the current network connection relationship between the plurality of network element devices; and the proxy activation information is sent to at least one network element devices in each connected domain, the at least one network element devices are activated as the proxy device, and the proxy device delivers a current proxy task. By using the proxy-based service processing method provided in the embodiments of the present invention, a plurality of proxy devices may be determined in a wireless network, the current proxy task is delivered to the proxy devices, and the proxy devices deliver service data to the network element devices in the network, perform service convergence, perform service data processing, or perform another operation. The server does not need to directly manage all network element devices, thereby improving overall maintenance efficiency of the wireless network. In addition, in the proxy-based service processing method provided in the embodiments of the present invention, the proxy device is determined based on the current network connection relationship between the plurality of network element devices. When the current network connection relationship changes, the proxy device can be changed at any time, thereby ensuring that the proxy device can be connected to as many network element devices as possible, and further improving management efficiency of the wireless network.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

Embodiments of the present invention provide a proxy-based service processing method and apparatus, so as to determine and activate at least one of network element devices managed by a server as a proxy device based on a current network connection relationship between the network element devices, and at least one proxy device performs a corresponding proxy function based on a current network requirement, and delivers service data to the network element devices, performs service convergence or performs service data processing, thereby improving data transmission and processing efficiency of a wireless network and reducing physical resources and bandwidth required when the server manages the wireless network.

Figure 1:
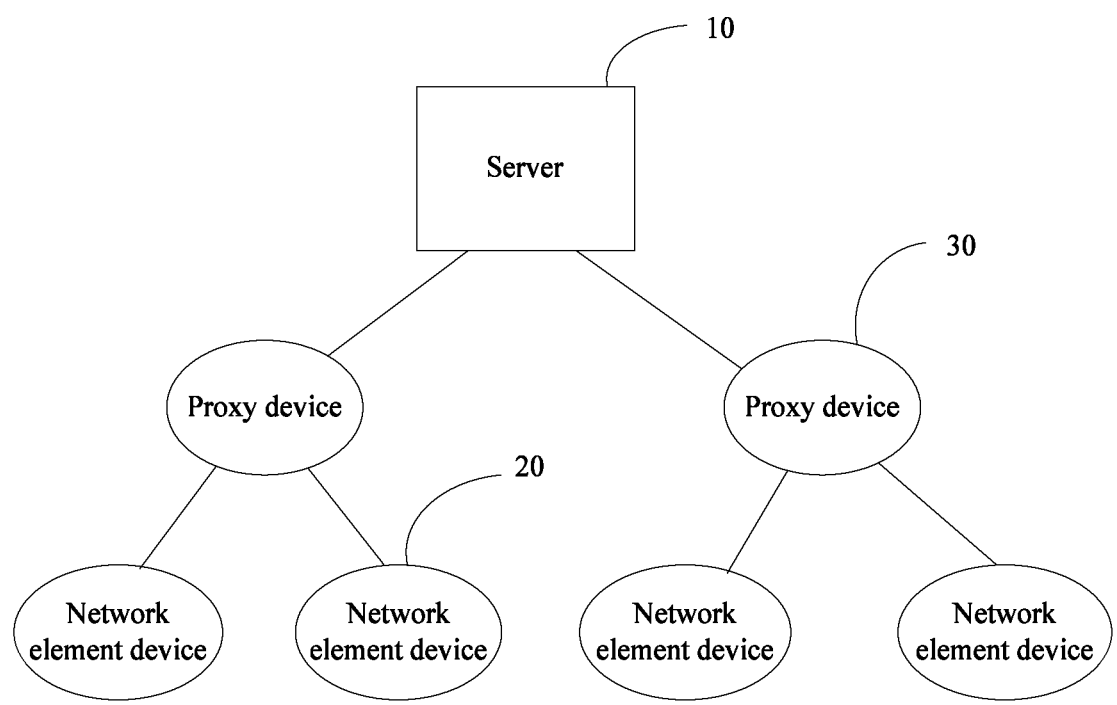
FIG. 1 is a schematic structural diagram of a proxy-based service processing system according to an embodiment of the present invention.

FIG. 1 is a schematic structural diagram of a proxy-based service processing system according to an embodiment of the present invention.

Referring to FIG. 1, the proxy-based service processing system provided in this embodiment of the present invention includes: a server 10, network element devices 20, and proxy devices 30. The network element devices 20 have a connection relationship. The server 10 designates some of the network element devices 20 as the proxy devices 30.

Figure 2:
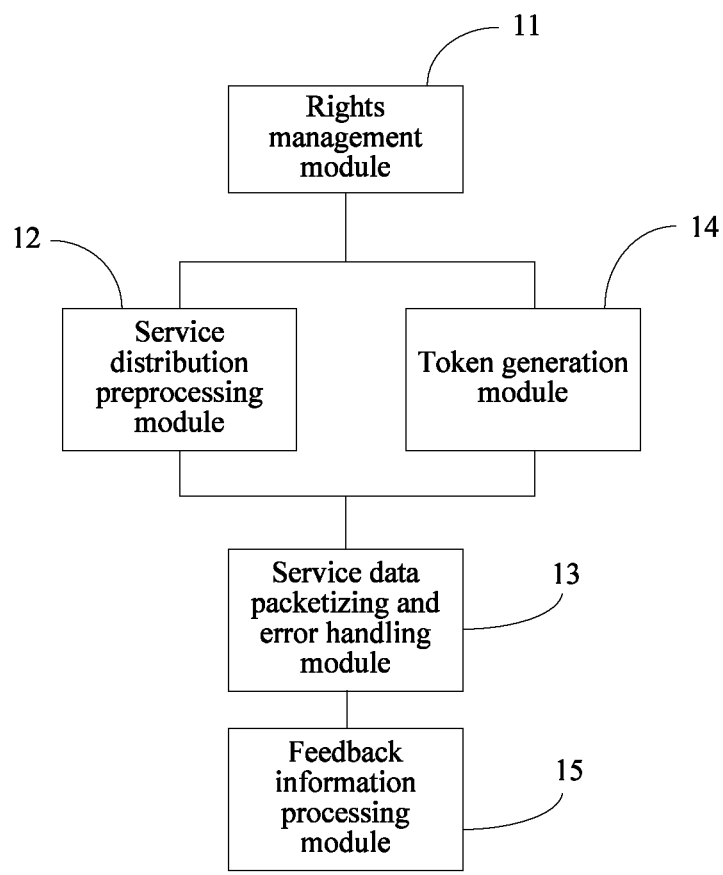
FIG. 2 is a schematic structural diagram of a server in FIG. 1.

FIG. 2 is a schematic structural diagram of the server in FIG. 1.

Referring to FIG. 1, the server 10 includes a rights management module 11, a service distribution preprocessing module 12, a service data packetizing and error handling module 13, a token generation module 14, and a feedback information processing module 15. The rights management module 11 is configured to designate some of the network element devices 20 as the proxy devices 30. The service distribution preprocessing module 12 is configured to: generate an information distribution list or a convergence list based on a network connection status and a service requirement, and provide a transmission label when information is uploaded and delivered. The service data packetizing and error handling module 13 is configured to packetize and distribute, based on the list generated by the service distribution preprocessing module 12, data that needs to be distributed. Specifically, the data that needs to be distributed is first distributed to the proxy devices 30, and the proxy devices 30 then send the data to other network element devices 20 based on the information distribution list, a time, and a chain of trust. In addition, the service data packetizing and error handling module 13 may perform data retransmission processing if the server 10 receives no response within a specified time. The token generation module 14 is configured to generate a security token that can be recognized by the proxy devices 30. The feedback information processing module 15 is configured to complete service processing based on a service flag and a convergence flag returned by the proxy devices 30. The service flag and the convergence flag are used to represent a completion status of a proxy task.

Figure 3:
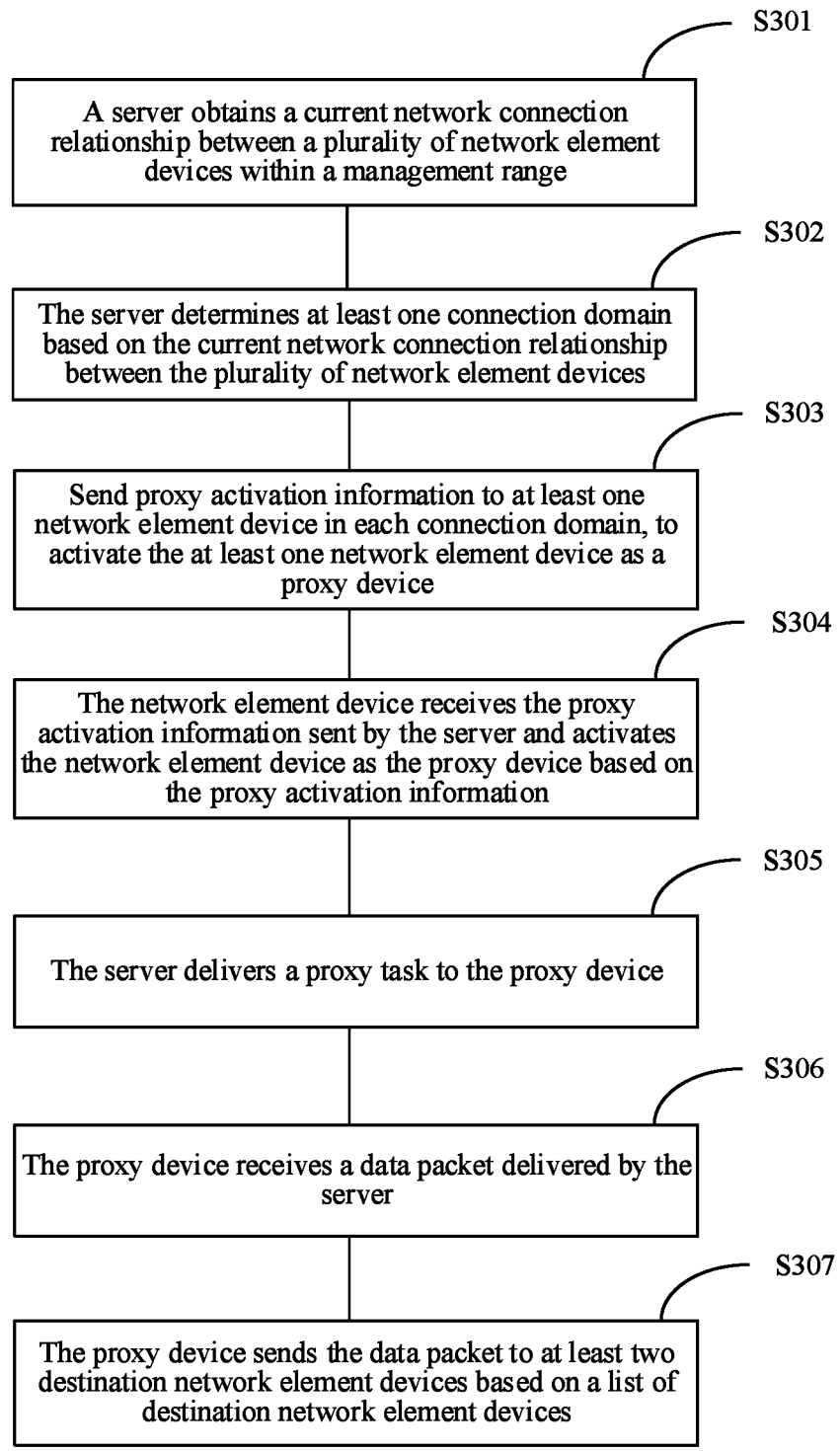
FIG. 3 is a schematic flowchart of a proxy-based service processing method according to an embodiment of the present invention.

FIG. 3 is a schematic flowchart of a proxy-based service processing method according to an embodiment of the present invention.

Referring to FIG. 3, the proxy-based service processing method in this embodiment of the present invention includes:

Operation S301: A server obtains a current network connection relationship between a plurality of network element devices within a management range.

In one embodiment, the current network connection relationship between the plurality of network element devices may change in real time based on a current network status. The server obtains the current network connection relationship between the plurality of network element devices within the management range in real time.

Operation S302: The server determines at least one connected domain based on the current network connection relationship between the plurality of network element devices, where at least two network element devices in each connected domain are connected to each other.

In one embodiment, the server calculates the connected domain of the plurality of network element devices within the current management range based on the current network connection relationship between the plurality of network element devices. There may be at least one connected domains. Each connected domain may include a plurality of network element devices. The at least two network element devices of the plurality of network element devices are connected to each other, and at least one network element device of the at least two network element devices may be simultaneously connected to a plurality of other network element devices in the connected domain. The network element device connected to the plurality of network element devices may be used as a proxy device.

Because the current network connection relationship between the plurality of network element devices changes as a current network status changes, the server may update the connected domain in real time based on a current connection status of a wireless network.

S303: Send proxy activation information to at least one network element device in each connected domain, to activate the at least one network element device as a proxy device.

Specifically, the server determines, based on a connection relationship of the network element devices in the at least one connected domain, at least one network element devices that can be used as the proxy devices, and sends the proxy activation information to the at least one network element devices.

Operation S304: The network element device receives the proxy activation information sent by the server and activates the network element device as the proxy device based on the proxy activation information.

In one embodiment, the proxy activation information includes identifier information of the network element device that can be used as the proxy device. The network element device that can be used as the proxy device is chosen by a rights management module of the server based on the current network connection relationship. The network element device is determined and activated as the proxy device based on the identifier information.

Operation S305: The server delivers a proxy task to the proxy device, where the proxy task includes: delivering service data to the network element devices in each connected domain, performing service convergence, or performing service data processing.

Operation S306: The proxy device receives a data packet delivered by the server, where the data packet includes a list of destination network element devices.

Operation S307: The proxy device sends the data packet to at least two destination network element devices based on the list of destination network element devices, where the proxy device and the at least two destination network element devices are connected to each other.

Further, the data packet may further include information of a list of commands to be forwarded, a manner of processing returned commands, and the like. The proxy device executes a proxy task corresponding to a forwarded command based on the list of forwarded commands, and sends feedback information to a feedback information processing module based on the manner of processing returned commands. For example, the manner of processing returned commands is showing that a returned result is a success or a failure.

In one embodiment, the proxy device may be connected to each network element device in the corresponding connected domain, so as to maximize execution efficiency of a proxy service. A plurality of network element devices meeting a proxy device condition may exist in the connected domain. A user may set, based on a requirement, a condition of selecting a proxy device, for example, set that the proxy device is a network element device having lowest load of all network element devices meeting the proxy device condition.

Further, based on the foregoing embodiment, before the sending proxy activation information to at least one network element device in each connected domain, to activate the at least one network element device as a proxy device, the method further includes:

sending proxy configuration instruction information to the at least one network element device in each connected domain, where the proxy configuration instruction information is used to instruct the network element device to obtain proxy configuration data, and the proxy configuration data and a proxy function of the proxy device have a mapping relationship.

Correspondingly, before the network element device receives the proxy activation information sent by the server and activates the network element device as the proxy device based on the proxy activation information, the method further includes:

receiving the proxy configuration instruction information; and obtaining the proxy configuration data, and configuring a proxy function based on the proxy configuration data.

In one embodiment, the proxy configuration data may be provided by a proxy application program corresponding to the proxy task. The proxy configuration instruction information may be a download link of the proxy application program.

The proxy task that can be executed by the proxy device may be updated and changed in real time based on a current status of the wireless network and a service requirement. The proxy task may include: service data delivery, service convergence, data parsing, data preprocessing, or the like. Persons skilled in the art may understand that the proxy task is not limited to the foregoing tasks, and may further be another function that can be implemented by the wireless network. When a current service requirement of the wireless network changes, a current proxy task of the proxy device may be changed by updating the proxy configuration data.

Further, the sending proxy configuration instruction information to the at least one network element device in each connected domain includes:

selecting at least one target network element device from the at least two network element devices included in each connected domain; and sending the proxy configuration instruction information to the at least one target network element device.

In one embodiment, the server may send the proxy configuration instruction information to the chosen target network element device before delivering the proxy task data, or may send the proxy configuration instruction information to the chosen target network element device at the same time when delivering the proxy task data, so that the target network element device obtains the proxy configuration data based on the proxy configuration instruction information and configures the proxy function.

In one embodiment, when the wireless network needs to support fast delivery of specific service data, the delivering, by the server, a proxy task to the proxy device includes:

obtaining the service data and service-data transmission path information, where the service-data transmission path information includes: an address of the proxy device and an address of a destination network element device;

generating a token based on the service-data transmission path information, and packetizing the token and the service data to generate a data packet; and sending the data packet to the destination network element device based on the token and by using the proxy device.

In one embodiment, the token includes any one or combination of: a list of the destination network element devices, a list of commands to be forwarded, a manner of processing returned information, and a validity time of the token, and a chain of trust, and the token is used by the destination network element device to recognize validity of the data packet sent by the server.

Correspondingly, after receiving the data packet, the target network element device parses the data packet to obtain a security token and the service data in the data packet, where the security token includes the list of destination network element devices; and sends the service data to the at least two destination network element devices based on the list of destination network element devices.

When the connected domain of the wireless network changes and a current proxy device no longer meets a condition of executing the proxy task, the server uses the rights management module to re-designate another network element device as a proxy device, and sends a deactivation instruction to the current proxy device, so that the current proxy device no longer has the proxy function and becomes a common network element device.

The foregoing method embodiment is described below by using an example in which the proxy device performs download service convergence of a software packet.

First, the server delivers the software packet that requires convergence to the proxy device, sends the proxy task data and the token to the network element device in the network, instructs the network element device to obtain information about the proxy device based on the token, and obtains the software packet from the proxy device. Because the plurality of network element devices download the software packet from the proxy device through a plurality of paths, overall bandwidth usage of the network is proportionally reduced, so that management load of the wireless network is reduced.

In one embodiment, convergence of other services also supports convergence of related statuses, faults or other information of nearby connected network element devices and reporting of the related statuses, faults or other information to the server by the proxy device, to perform centralized batch processing, reduce scheduling, reduce threads, and improve efficiency.

In the proxy-based service processing method provided in this embodiment of the present invention, the server obtains the current network connection relationship between the plurality of network element devices within the management range; determines at least one connected domain based on the current network connection relationship between the plurality of network element devices; and activates the at least one network element device in each connected domain as the proxy device, and delivers the current proxy task by using the proxy device. By using the proxy-based service processing method provided in this embodiment of the present invention, the plurality of proxy devices may be determined in the wireless network, the current proxy task is delivered to the proxy devices, and the proxy devices deliver service data to the network element devices in the network, perform service convergence, perform service data processing, or perform another operation. The server does not need to directly manage all network element devices, thereby improving overall maintenance efficiency of the wireless network. In addition, in the proxy-based service processing method provided in this embodiment of the present invention, the proxy device is determined based on the current network connection relationship between the plurality of network element devices. When the current network connection relationship changes, the proxy device can be changed at any time, thereby ensuring that the proxy device can be connected to as many network element devices as possible, and further improving management efficiency of the wireless network.

Figure 4:
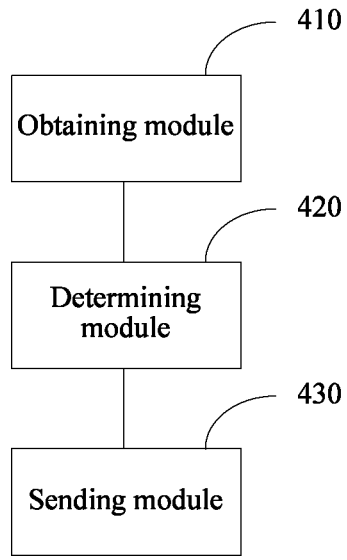
FIG. 4 is a schematic structural diagram of a proxy-based service processing apparatus according to an embodiment of the present invention.

FIG. 4 is a schematic structural diagram of a proxy-based service processing apparatus according to an embodiment of the present invention.

Referring to FIG. 4, the proxy-based service processing apparatus provided in this embodiment of the present invention includes:

an obtaining module 410, configured to obtain a current network connection relationship between a plurality of network element devices within a management range;

a determining module 420, configured to determine at least one connected domain based on the current network connection relationship between the plurality of network element devices, where at least two network element devices in each connected domain are connected to each other; and a sending module 430, configured to send proxy activation information to at least one network element device in each connected domain, to activate the at least one network element device as a proxy device, where the sending module 430 is further configured to deliver a proxy task to the proxy device, where the proxy task includes: delivering service data to the network element devices in each connected domain, performing service convergence, or performing service data processing.

In one embodiment, the sending module 430 is further configured to: before sending the proxy activation information to the at least one network element device in each connected domain, to activate the at least one network element device as the proxy device, send proxy configuration instruction information to the at least one network element device in each connected domain, where the proxy configuration instruction information is used to instruct the network element device to obtain proxy configuration data, and the proxy configuration data and the proxy task have a mapping relationship.

In one embodiment, the sending module 430 is configured to:

select at least one target network element device from the at least two network element devices included in each connected domain; and send the proxy configuration instruction information to the at least one target network element device.

In one embodiment, the sending module 430 is configured to:

obtain proxy task data and proxy-task-data transmission path information, where the proxy-task-data transmission path information includes: an address of the proxy device and an address of a destination network element device;

generate a token based on the proxy-task-data transmission path information, and packetize the token and the proxy task data to generate a data packet; and send the data packet to the destination network element device based on the token and by using the proxy device.

In one embodiment, the token includes any one or combination of: a list of the destination network element devices, a list of commands to be forwarded, a manner of processing returned information, a validity time of the token, and a chain of trust.

The proxy-based service processing apparatus provided in this embodiment of the present invention is configured to perform the proxy-based service processing method provided in the foregoing method embodiment, and specific implementation principles and technical effects of the proxy-based service processing apparatus are similar to those in the method embodiment. Details are not described herein again.

Figure 5:
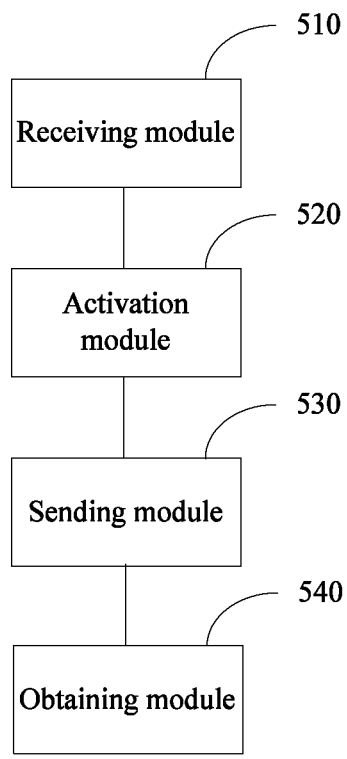
FIG. 5 is a schematic structural diagram of a network element device according to an embodiment of the present invention.

FIG. 5 is a schematic structural diagram of a network element device according to an embodiment of the present invention.

Referring to FIG. 5, the network element device provided in this embodiment of the present invention includes:

a receiving module 510, configured to receive proxy activation information sent by a server;

an activation module 520, configured to activate the network element device as a proxy device based on the proxy activation information, where the receiving module 510 is further configured to receive a data packet delivered by the server, where the data packet includes a list of destination network element devices; and a sending module 530, configured to send the data packet to at least two destination network element devices based on the list of destination network element devices, where the proxy device and the at least two destination network element devices are connected to each other.

In one embodiment, the receiving module 510 is further configured to: before the proxy activation information sent by the server is received and the network element device is activated as the proxy device based on the proxy activation information, receive proxy configuration instruction information, where the proxy configuration instruction information is used to instruct the network element device to obtain proxy configuration data, and the proxy configuration data and content of the data packet have a mapping relationship; and the network element device further includes:

an obtaining module 540, configured to: obtain the proxy configuration data, and configure a proxy function based on the proxy configuration data.

In one embodiment, the data packet further includes a security token and proxy task data, and the sending module 530 is configured to:

parse the data packet to obtain the security token and the proxy task data in the data packet, where the security token includes the list of destination network element devices; and send service data to the at least two destination network element devices based on the list of destination network element devices.

In one embodiment, the token includes any one or combination of: the list of destination network element devices, a list of commands to be forwarded, a manner of processing returned information, a validity time of the token, and a chain of trust.

The network element device provided in this embodiment of the present invention is configured to perform the proxy-based service processing method provided in the foregoing method embodiment, and specific implementation principles and technical effects of the network element device are similar those in the method embodiment. Details are not described herein again.

Figure 6:
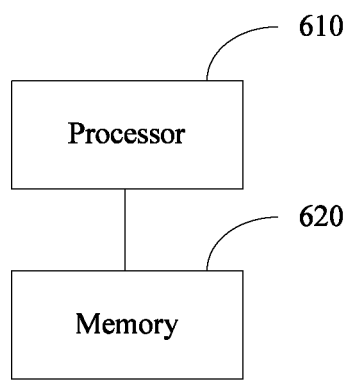
FIG. 6 is a schematic structural diagram of another proxy-based service processing apparatus according to an embodiment of the present invention.

FIG. 6 is a schematic structural diagram of another proxy-based service processing apparatus according to an embodiment of the present invention.

Referring to FIG. 6, the proxy-based service processing apparatus provided in this embodiment of the present invention includes:

a processor 610 and a memory 620, where the memory 620 is configured to store a program instruction, and the processor 610 is configured to invoke the program instruction in the memory 620 to perform the method in the foregoing method embodiment.

The proxy-based service processing apparatus provided in this embodiment of the present invention is configured to perform the proxy-based service processing method provided in the foregoing method embodiment, and specific implementation principles and technical effects of the proxy-based service processing apparatus are similar to those in the method embodiment. Details are not described herein again.

Figure 7:
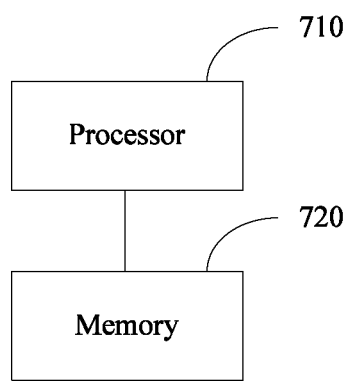
FIG. 7 is a schematic structural diagram of another network element device according to an embodiment of the present invention.

FIG. 7 is a schematic structural diagram of another network element device according to an embodiment of the present invention.

Referring to FIG. 7, the network element device provided in this embodiment of the present invention includes:

a processor 710 and a memory 720, where the memory 720 is configured to store a program instruction, and the processor 710 is configured to invoke the program instruction in the memory 720 to perform the method in the foregoing method embodiment.

The network element device provided in this embodiment of the present invention is configured to perform the proxy-based service processing method provided in the foregoing method embodiment, and specific implementation principles and technical effects of the network element device are similar to those in the method embodiment. Details are not described herein again.

Persons of ordinary skill in the art may understand that all or some of the operations of the method embodiments may be implemented by a program instructing relevant hardware. The program may be stored in a computer-readable storage medium. When the program runs, the operations of the method embodiments are performed. The foregoing storage medium includes: any medium that can store program code, such as a ROM, a RAM, a magnetic disk, or an optical disc.

What is claimed is:

1. A proxy-based service processing method, comprising:
    obtaining, by a server, a current network connection relationship between a plurality of network element devices within a management range;
    determining at least one connected domain based on the current network connection relationship between the plurality of network element devices, wherein at least two network element devices in each connected domain are connected to each other;
    sending proxy activation information to at least one network element device in each connected domain to activate the at least one network element device as a proxy device; and
    delivering a proxy task to the proxy device, wherein the proxy task comprises: delivering service data to the network element devices in each connected domain, performing service convergence, or performing service data processing.

2. The method according to claim 1, wherein before the sending proxy activation information to at least one network element device in each connected domain to activate the at least one network element device as a proxy device, the method further comprises:
  sending proxy configuration instruction information to the at least one network element device in each connected domain, wherein the proxy configuration instruction information is used to instruct the network element device to obtain proxy configuration data, and the proxy configuration data and the proxy task have a mapping relationship.

3. The method according to claim 2, wherein the sending proxy configuration instruction information to the at least one network element device in each connected domain comprises:
  selecting at least one target network element device from the at least two network element devices comprised in each connected domain; and
  sending the proxy configuration instruction information to the at least one target network element device.

4. The method according to claim 1, wherein the delivering a proxy task to the proxy device comprises:
  obtaining proxy task data and proxy-task-data transmission path information, wherein the proxy-task-data transmission path information comprises: an address of the proxy device and an address of a destination network element device;
  generating a token based on the proxy-task-data transmission path information, and packetizing the token and the proxy task data to generate a data packet; and
  sending the data packet to the destination network element device based on the token and using the proxy device.

5. The method according to claim 4, wherein the token comprises any one or combination of: a list of destination network element devices, a list of commands to be forwarded, a manner of processing returned information, a validity time of the token, and a chain of trust.

6. A proxy-based service processing method, comprising:
  receiving, by a network element device, proxy activation information from a server, and activating the network element device as a proxy device based on the proxy activation information;
  receiving, by the proxy device, a data packet from the server, wherein the data packet comprises a list of destination network element devices;
  sending, by the proxy device, the data packet to at least two destination network element devices based on the list of destination network element devices, wherein the proxy device and the at least two destination network element devices are connected to each other.

7. The method according to claim 6, wherein before the receiving, by a network element device, proxy activation information from the server, and activating the network element device as a proxy device based on the proxy activation information, the method further comprises:
  receiving proxy configuration instruction information, wherein the proxy configuration instruction information is used to instruct the network element device to obtain proxy configuration data, and the proxy configuration data and content of the data packet have a mapping relationship; and
  obtaining the proxy configuration data, and configuring a proxy function based on the proxy configuration data.

8. The method according to claim 6, wherein the data packet further comprises a security token and proxy task data, and the sending the data packet to at least two destination network element devices based on the list of destination network element devices comprises:
  parsing the data packet to obtain the security token and the proxy task data in the data packet, wherein the security token comprises the list of destination network element devices; and
  sending service data to the at least two destination network element devices based on the list of destination network element devices.

9. The method according to claim 8, wherein the security token comprises any one or combination of: the list of destination network element devices, a list of commands to be forwarded, a manner of processing returned information, a validity time of the security token, and a chain of trust.

10. A proxy-based service processing apparatus, comprising:
  an obtaining module configured to obtain a current network connection relationship between a plurality of network element devices within a management range;
  a determining module configured to determine at least one connected domain based on the current network connection relationship between the plurality of network element devices, wherein at least two network element devices in each connected domain are connected to each other;
  a sending module configured to send proxy activation information to at least one network element device in each connected domain to activate the at least one network element device as a proxy device, wherein
  the sending module is further configured to deliver a proxy task to the proxy device, wherein the proxy task comprises: delivering service data to the network element devices in each connected domain, performing service convergence, or performing service data processing.

11. The apparatus according to claim 10, wherein the sending module is further configured to: before sending the proxy activation information to the at least one network element device in each connected domain to activate the at least one network element device as the proxy device,
  send proxy configuration instruction information to the at least one network element device in each connected domain, wherein the proxy configuration instruction information is used to instruct the network element device to obtain proxy configuration data, and the proxy configuration data and the proxy task have a mapping relationship.

12. The apparatus according to claim 11, wherein the sending module is configured to:
  select at least one target network element device from the at least two network element devices comprised in each connected domain; and
  send the proxy configuration instruction information to the at least one target network element device.

13. The apparatus according to claim 10, wherein the sending module is configured to:
  obtain proxy task data and proxy-task-data transmission path information, wherein the proxy-task-data transmission path information comprises: an address of the proxy device and an address of a destination network element device;
  generate a token based on the proxy-task-data transmission path information, and packetize the token and the proxy task data to generate a data packet; and
  send the data packet to the destination network element device based on the token and by using the proxy device.

14. The apparatus according to claim 13, wherein the token comprises any one or combination of: a list of destination network element devices, a list of commands to be forwarded, a manner of processing returned information, a validity time of the token, and a chain of trust.

15. A network element device, comprising:
a receiving module configured to receive proxy activation information from a server;
an activation module configured to activate the network element device as a proxy device based on the proxy activation information, wherein
the receiving module is further configured to receive a data packet from the server, wherein the data packet comprises a list of destination network element devices; and
a sending module configured to send the data packet to at least two destination network element devices based on the list of destination network element devices, wherein the proxy device and the at least two destination network element devices are connected to each other.

16. The network element device according to claim 15, wherein
the receiving module is further configured to: before the proxy activation information sent by the server is received and the network element device is activated as the proxy device based on the proxy activation information, receive proxy configuration instruction information, wherein the proxy configuration instruction information is used to instruct the network element device to obtain proxy configuration data, and the proxy configuration data and content of the data packet have a mapping relationship; and
the network element device further comprises:
an obtaining module configured to: obtain the proxy configuration data, and configure a proxy function based on the proxy configuration data.

17. The network element device according to claim 15, wherein the data packet further comprises a security token and proxy task data, and the sending module is configured to:
parse the data packet to obtain the security token and the proxy task data in the data packet, wherein the security token comprises the list of destination network element devices; and
send service data to the at least two destination network element devices based on the list of destination network element devices.

18. The network element device according to claim 15, wherein the security token comprises any one or combination of: the list of destination network element devices, a list of commands to be forwarded, a manner of processing returned information, a validity time of the security token, and a chain of trust.

* * * * *